United States Patent [19]

Roust

[11] Patent Number: 4,716,563
[45] Date of Patent: Dec. 29, 1987

[54] DEMODULATION OF AUXILIARY LOW FREQUENCY CHANNELS IN DIGITAL TRANSMISSION SYSTEMS

[75] Inventor: Robert C. Roust, Basildon, Great Britain

[73] Assignee: STC PLC, London, England

[21] Appl. No.: 865,213

[22] Filed: May 19, 1986

[30] Foreign Application Priority Data

May 21, 1985 [GB] United Kingdom ............... 8512876

[51] Int. Cl.⁴ .......................... H04J 3/12; H04B 1/16
[52] U.S. Cl. ................................. 370/110.4; 455/214
[58] Field of Search ......................... 370/110.4, 110.1; 178/49; 375/46, 48, 52, 79, 89; 455/206, 214; 307/3, 4

[56] References Cited

U.S. PATENT DOCUMENTS 3,666,889  5/1972  Zegers et al. ................... 370/110.4
4,156,848  5/1979  Stimple et al. ...................... 455/214
4,627,077  12/1986  Armstrong ....................... 370/110.4

Primary Examiner—Douglas W. Olms
Assistant Examiner—Frank M. Scutch, III
Attorney, Agent, or Firm—Lee, Smith & Zickert

[57] ABSTRACT

An arrangement for the demodulation of auxiliary low frequency channels in digital transmission systems comprising means (12) for receiving the transmitted signals, linear amplification means (13) with automatic gain control (AGC) (14) for the received signals, non linear discrimination means (15) for discriminating between logic levels in the amplified digital signals at the main channel bit rate, and subtraction means (16) for subtracting the output of the discrimination means from the amplified signals to obtain the auxiliary low frequency channel signals.

6 Claims, 8 Drawing Figures $f_L$ = LOW FREQUENCY CUT OFF (WHERE RECEIVED POWER DENSITY BECOMES LESS THAN RECEIVER NOISE POWER DENSITY)

$f_R$ = NULL (USUALLY AT DATA RATE)

$f_a$ = AUXILIARY BAND RATE $f_b$ = AUXILIARY CHANNEL CARRIER FREQUENCY

4,716,563

DEMODULATION OF AUXILIARY LOW FREQUENCY CHANNELS IN DIGITAL TRANSMISSION SYSTEMS

BACKGROUND OF THE INVENTION

This invention relates to the demodulation of auxiliary low frequency channels in digital transmission systems, and is particularly but not exclusively suited to optical transmission systems.

Several methods of providing auxiliary low frequency channels in high speed digital systems are known. For example, it is known in pulse code modulation systems to add one extra bit to each code group, the extra bits forming what may be termed a "distributed" code for an extra channel. Another arrangement is to impose a form of pulse position modulation of a selected bit position in a p.c.m. code. In optical systems it is known to impose low level low frequency amplitude modulation on digitally modulated laser.

The present invention is concerned with a system in which low frequency digitally coded signals for an auxiliary channel are superimposed on a high frequency main digital signal. The auxiliary channel may for instance by a binary channel at baseband, say FSK (frequency shift keyed) or PSK (phase shift keyed) or even ASK (amplitude shift keyed) at, typically, 70 kb/s on a 4 MHz channel whilst the main channel(s) is scrambled binary at 565 mb/sec.

SUMMARY OF THE INVENTION

According to the invention there is provided an arrangement for the demodulation of auxiliary low frequency channels in digital transmission systems comprising means for receiving the transmitted signals, linear amplification means with automatic gain control (AGC) for the received signals, non linear discrimination means for discriminating between logic levels in the amplified digital signals at the main channel bit rate, and subtraction means for subtracting the output of the discrimination means from the amplified signals to obtain the auxiliary low frequency channel signals.

BRIEF DESCRIPTION OF THE DRAWINGS

Embodiments of the invention will now be described with reference to the accompanying drawings, in which.

DESCRIPTION OF THE PREFERRED EMBODIMENTS

Figure 1:
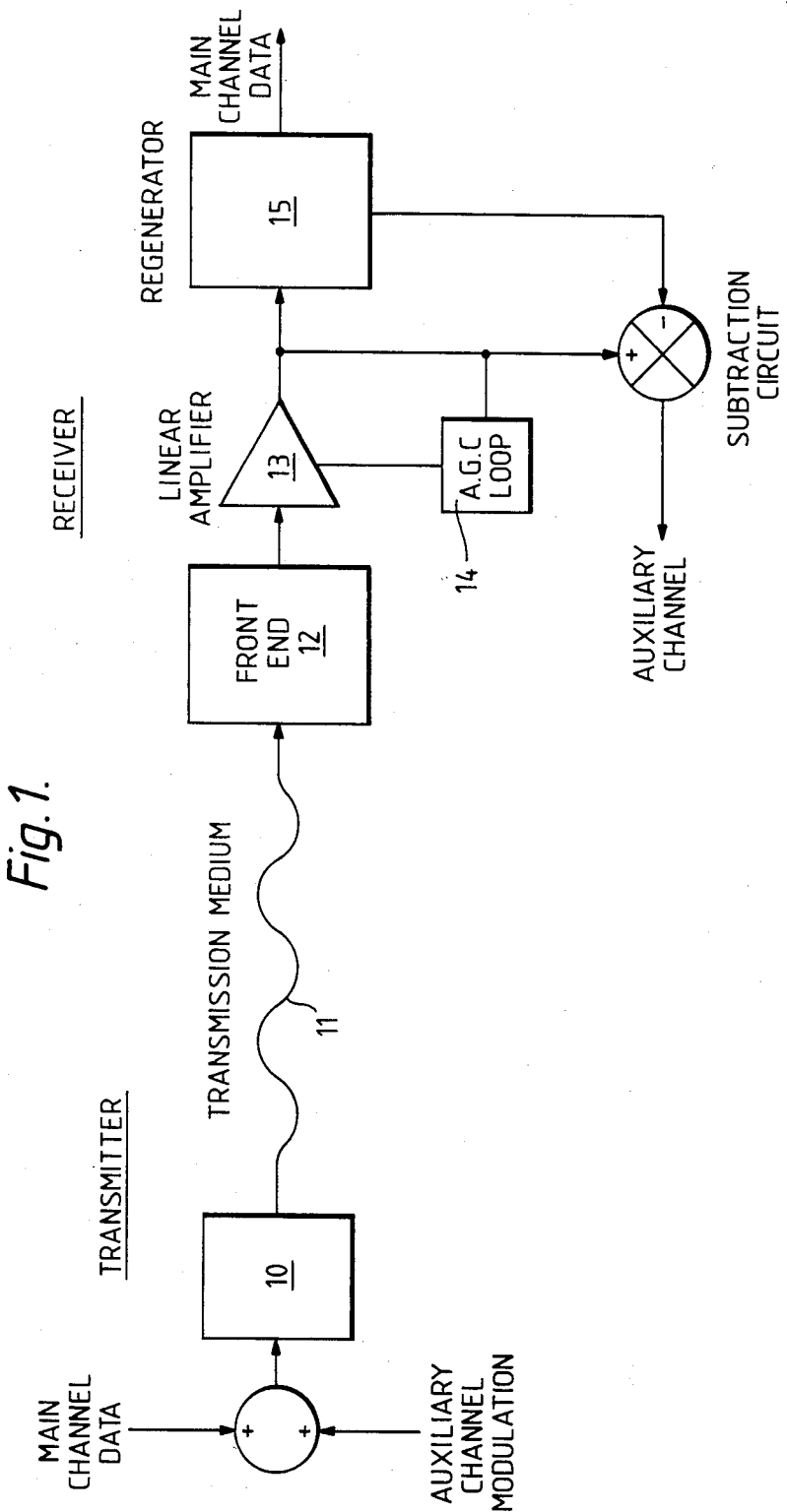
FIG. 1 is a general outline of a digital transmission system with an auxiliary low frequency channel.
Figure 2A:
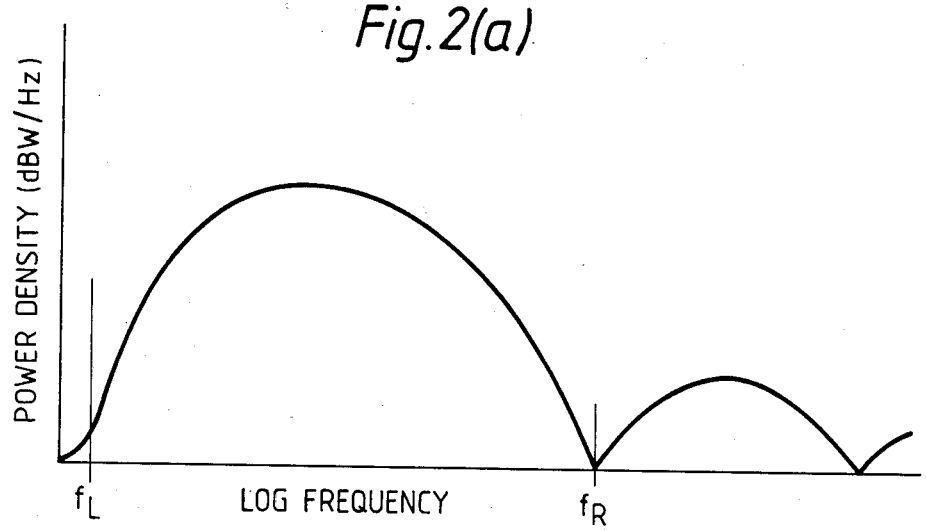
FIGS. 2a–2d are graphs illustrating different aspects of digital data spectra.
Figure 2B:
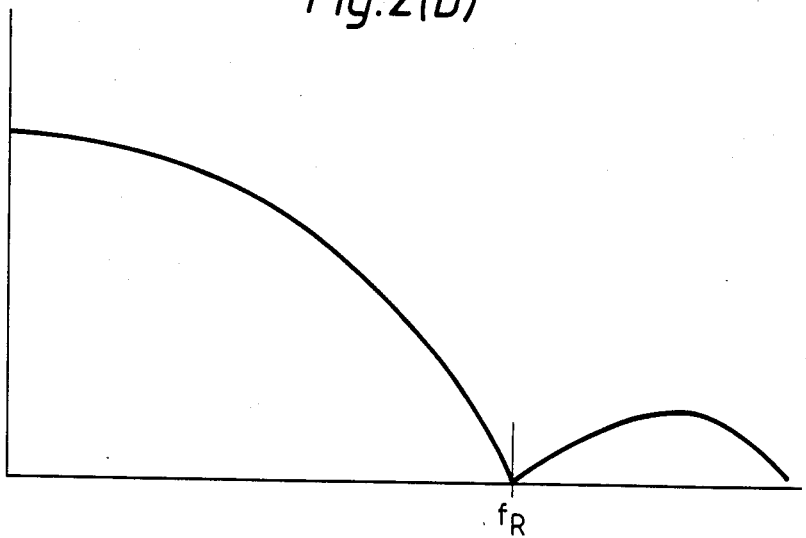

In the system illustrated in FIG. 1 a transmitter 10 is fed with a composite input signal being a high speed, e.g. 565 Mb/s, scrambled binary signal to which has been added a low speed, e.g. 70 Kb/s, auxiliary channel signal. The form of modulation used for the auxiliary channel is not unique. A typical baseband spectrum for random (or pseudo random) binary data encoded for transmission on an optical line system is shown in FIG. 2(a). Where an unbalanced line code is used this spectrum will extend down to d.c., as shown in FIG. 2(b). The code cancelling receivers to be described enable the provision of auxiliary low frequency channels when an unbalanced line code is used or when the low frequency cut off of the main data channel is too low for the auxiliary channel to be modulated in a spectrum below the main data spectrum.

Figure 2C:
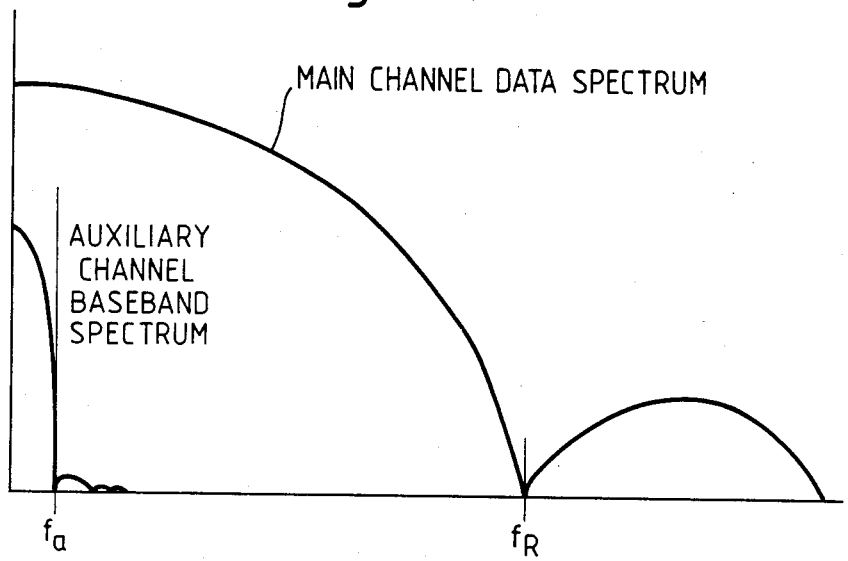
Figure 2D:
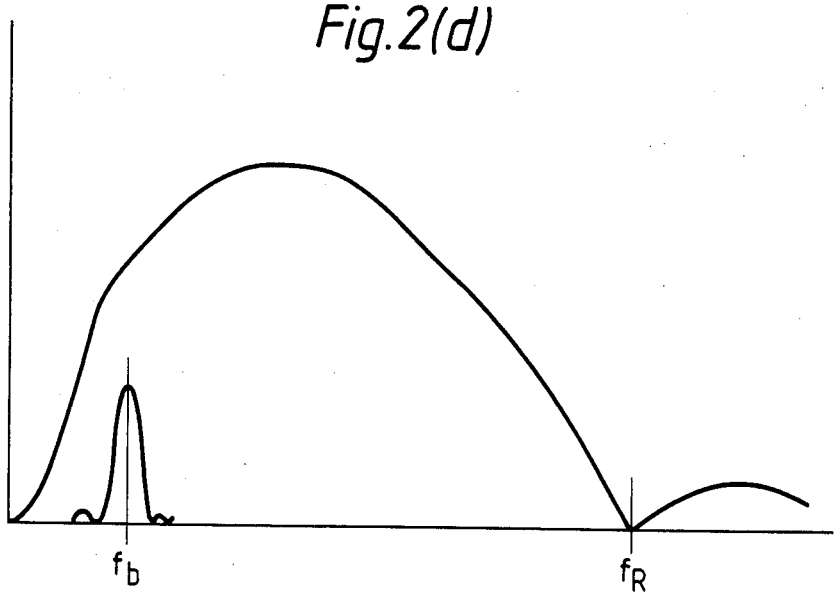

In an optical system many types of auxiliary channel can be provided by adding an extra modulating current to the light source modulation. The auxiliary channel may be a binary channel at baseband, FIG. 2(c), or may be FSK, PSK or ASK modulated on a carrier, FIG. 2(d), but in general has a bandwidth considerably less than the main data channel.

In the receiver shown in FIG. 1 the signals received from the transmission medium 11 are first passed through a conventional receiver front end 12. A linear amplifier 13, with a conventional A.G.C. loop 14, provides a peak-to-peak digital signal of the required shape, which is then fed to a conventional main channel digital regenerator 15. The regenerator, being designed to cope specifically with the high frequency main channel signals will discriminate against the low frequency auxiliary channel signals, so its output is essentially the main channel data. This data is then fed to a subtraction circuit 16 where it is subtracted from the linear amplifier output. The residue from the subtraction circuit is the auxiliary channel modulation.

Figure 3:
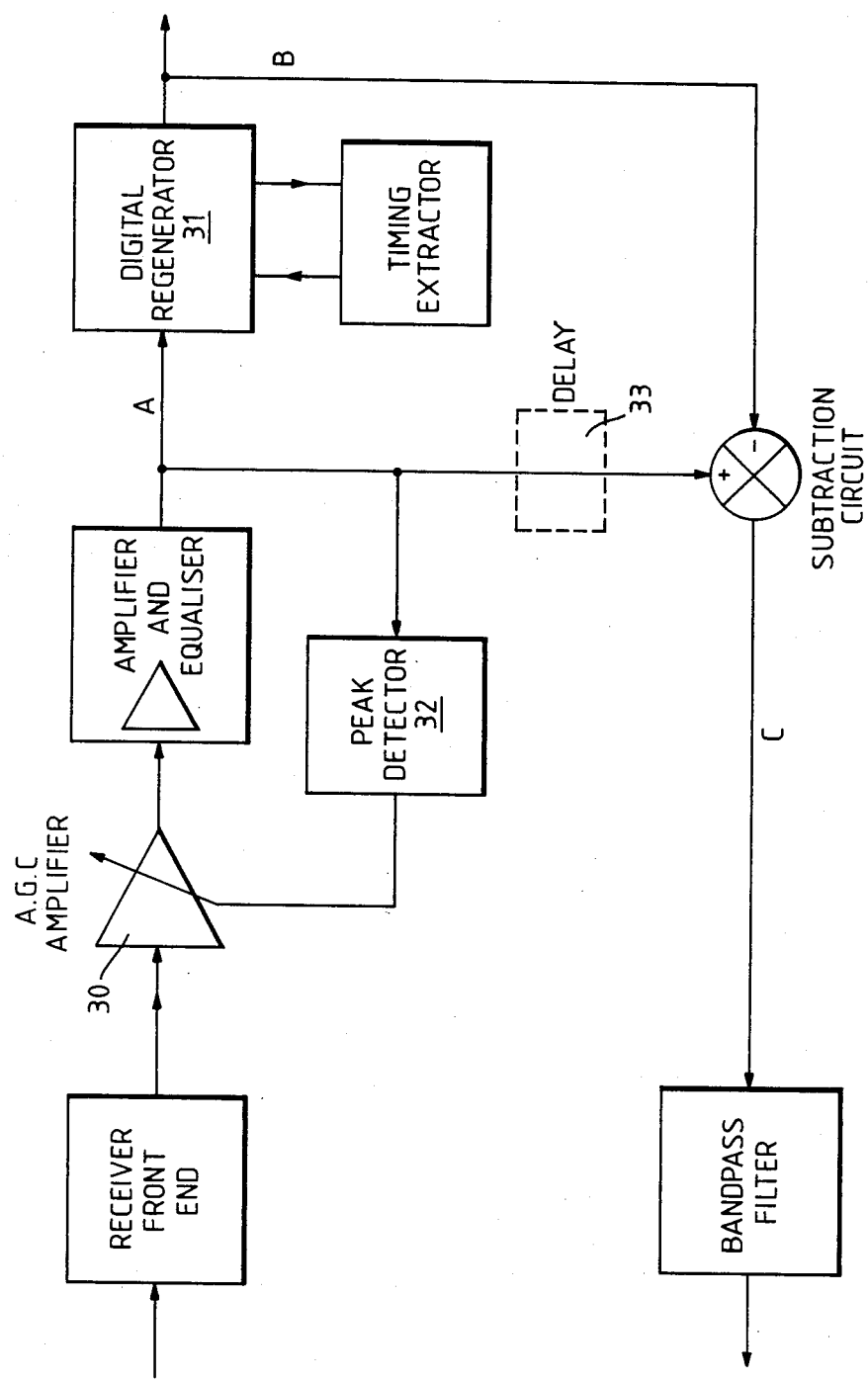
FIG. 3 is a block diagram of a code cancelling receiver.

A modified receiver is shown in FIG. 3. The linear A.G.C. amplifier 30 produces the peak-to-peak signal of the desired pulse shape (e.g. raised cosine) at 'A'. Conventional regenerator 31 produces the regenerated main channel data at 'B'. A peak detector circuit 32 sets the A.G.C. for the linear amplifier 30 such that the peak-to-peak amplitude at 'A' is the same as that at 'B'. When 'B' is subtracted from 'A' the output at 'C' will contain only the auxiliary channel energy plus noise components. The output at 'C' is then band-pass filtered. Note that the phase of 'B' need not be matched closely to 'A' for the recovery of signals at frequencies much lower than the main channel baud rate. However, the addition of a time delay element 33 between A and the subtraction circuit will enable frequencies to be used approaching the main baud rate. Note also that the subtraction circuit should be a linear differential amplifier. If a non linear comparator is used the peak-to-peak waveforms must be very accurately determined. The low frequency cut-off of the receiver amplifier chain should be lower than the lowest frequency encountered in the auxiliary channel.

Figure 4:
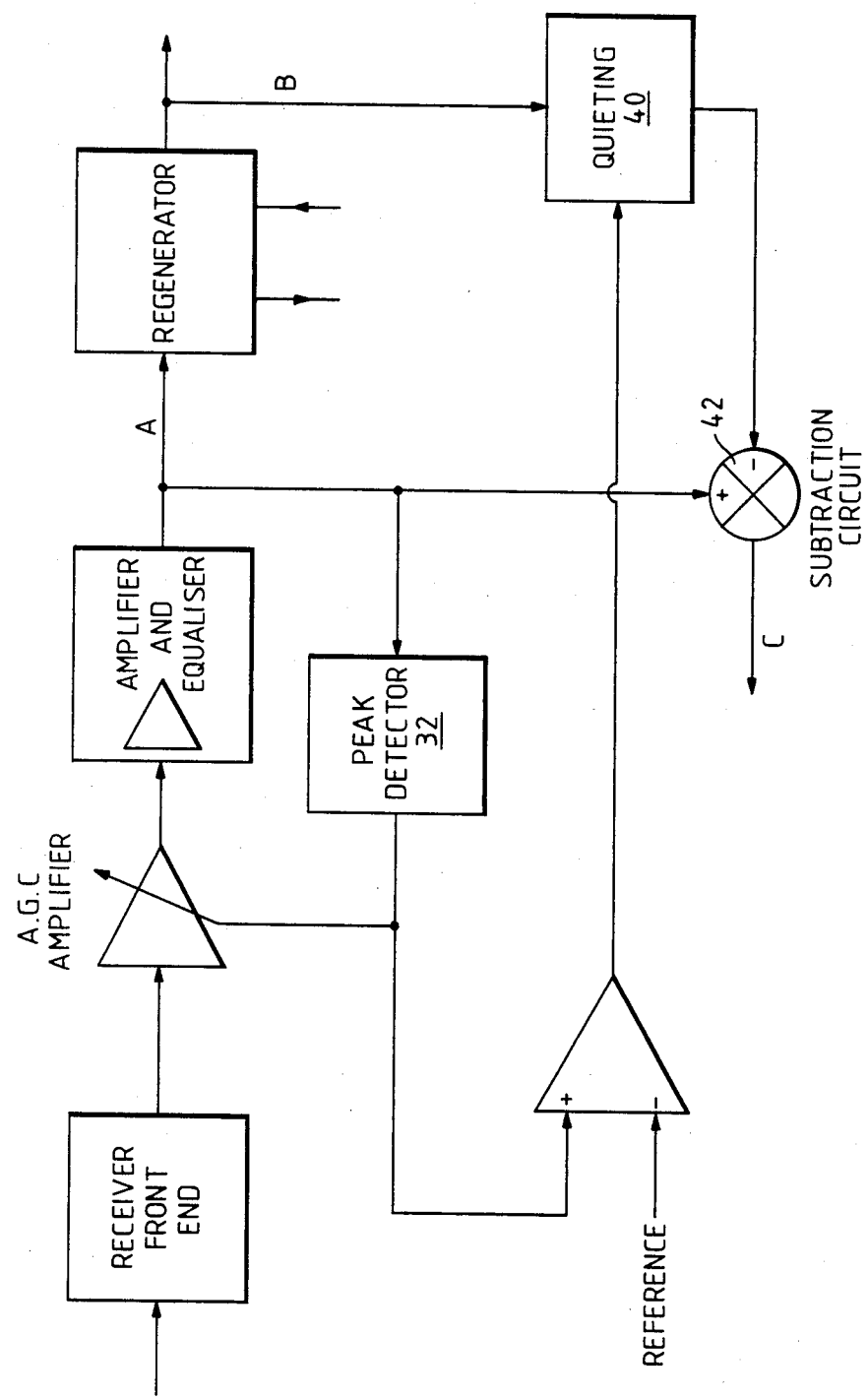
FIG. 4 is a block diagram of a modified code cancelling receiver.

The auxiliary channel can be maintained in the presence of moderate error rates on the main channel and can even be maintained with the condition of no transmitted main channel data. In order to do this, however, it is essential that there should be a fixed output from the regenerator. This can be catered for by the addition of a quieting circuit 40 controlled by the peak detector 41 (FIG. 4), providing the peak detector is not sensitive to the modulations in the auxiliary signal. A bandstop filter or low modulation level can prevent such sensitivity. When the peak detector senses a lack of signal the blanking or quieting circuit 40 is enabled so that the output of the regenerator, which in the absence of main channel data consists only of noise, is removed from the subtraction circuit 42.

Figure 5:
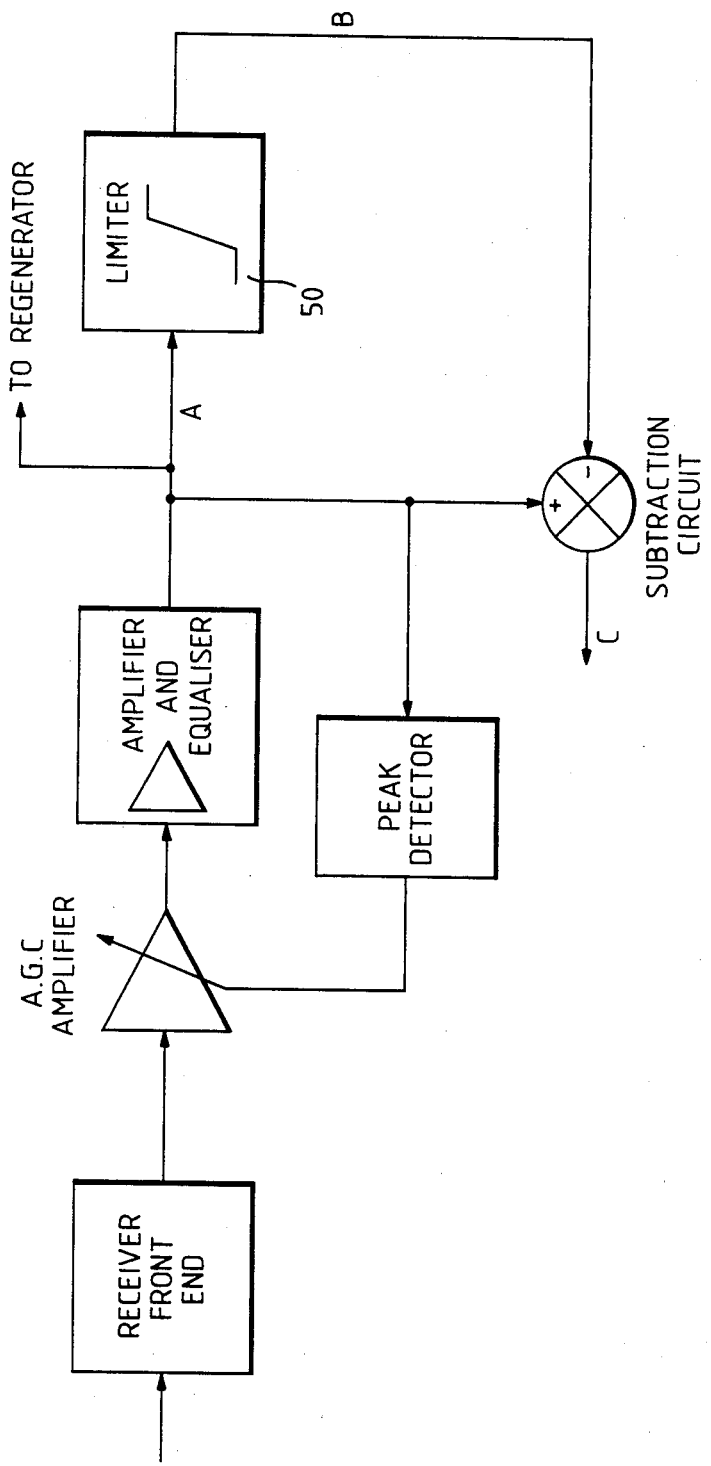
FIG. 5 is a block diagram of an alternative code cancelling receiver.

Differences in jitter content between the data at A and B will constitute a noise component in the auxiliary channel. Hence, the timing extraction associated with a digital regenerator must not add or subtract high levels of jitter over the auxiliary frequency band. To avoid this the arrangement shown in FIG. 5 may be used. Instead of substracting the output of the regenerator from the A.G.C. amplifier output, the amplifier output is fed separately to a non-linear limiting amplifier 50. The limiter output is now subtracted from the amplifier output to recover the auxiliary channel data. The limiting amplifier cut-off is set so that it discriminates between the discrete logic levels in the received signals at the main channel bit rate.

I claim:

1. An arrangement for the demodulation of auxiliary low frequency channels in digital transmission systems comprising means for receiving the transmitted signals, linear amplification means with automatic gain control (AGC) to which the output of the receiving means is applied, non-linear discriminaton means to which the output of the amplification means is applied for discriminating between logic levels in the amplified digital signals at the main channel bit rate, and subtraction means to one input of which the output of the amplification means is applied and to a second input of which the output of the discrimination means is applied for subtracting the output of the discrimination means from the amplified signals to obtain the auxiliary low frequency channel signals.

2. An arrangement according to claim 1 wherein the AGC for the linear amplification means includes peak signal detection means such that the peak-to-peak amplitude of the amplified signals input to the discrimination means is substantially the same as that at the output of the discrimination means.

3. An arrangement according to claim 1 or 2 wherein the non-linear discrimination means comprises a digital signal regenerator.

4. An arrangement according to claim 1 or 2 including time delay means in the output of the linear amplifier applied to the subtraction means to compensate for propagation times in the discrimination means.

5. An arrangement according to claim 2 including a quieting circuit in the output of the discrimination means applied to the subtraction means, the quieting circuit being responsive to an output from the peak signal detection in the absence of main channel signals.

6. An arrangement according to claim 1 or 2 wherein the non-linear discrimination means comprises a limiting amplifier.

* * * * *